United States Patent [19]

Webber

[11] 4,446,554
[45] May 1, 1984

[54] ARRANGEMENT FOR MULTIPLE CUSTOM CALLING

[75] Inventor: Robert C. Webber, Glendale, Ariz.

[73] Assignee: GTE Automatic Electric Labs Inc., Northlake, Ill.

[21] Appl. No.: 316,377

[22] Filed: Oct. 29, 1981

[51] Int. Cl.³ .......................................... H04Q 11/04
[52] U.S. Cl. ................................. 370/62; 179/18 BG
[58] Field of Search .................. 370/62, 63; 179/18 B, 179/18 BC, 18 BG

[56] References Cited

U.S. PATENT DOCUMENTS

| 3,504,123 | 3/1970 | Fischer et al. | 370/62 |
| 3,517,135 | 6/1970 | Fisch et al. | 370/62 |
| 3,967,070 | 6/1976 | Srivastava et al. | 370/62 |
| 3,997,731 | 12/1976 | Wilmot et al. | 179/18 B |

FOREIGN PATENT DOCUMENTS

| 52-20712 | 2/1977 | Japan | 179/18 BG |
| 56-56023 | 5/1981 | Japan | 179/18 BG |

OTHER PUBLICATIONS

"ITT 1220 Digital Exchange" by J. M. Cotton, Electrical Communication, vol. 54, No. 3, 1979, pp. 215-224.

Primary Examiner—Douglas W. Olms
Attorney, Agent, or Firm—Frank J. Bogacz; Robert J. Black

[57] ABSTRACT

The arrangement described herein provides for simple control and minimal program impact of a central office switching system for interfacing multiple custom calls. This arrangement employs a few simple trunks connected in a loop around configuration. The arrangement shown considers the connection of a telephone subscriber to a call waiting subscriber who is already engaged in another custom calling subscriber's call waiting call.

6 Claims, 4 Drawing Figures

ARRANGEMENT FOR MULTIPLE CUSTOM CALLING

BACKGROUND OF THE INVENTION

1. Cross-Reference to Related Applications

The present application is related to copending U.S. patent application Ser. Nos. 316,252; 316,254; 316,255; and 316,268, having the same inventive entity and being assigned to the same assignee.

2. Field of the Invention

The present invention pertains to multiple custom telephone calling features and more particularly to an arrangement for controlling these custom calling features which interface with one another in a common central office.

3. Description of the Prior Art

As computerization was introduced into telephone switching offices, it was understood that more complex functions could be provided by the switching office. Among these functions are such features as special ticketing and billing arrangements and custom calling features such as three way calling, call forwarding, speed calling, and call waiting. To implement each of these special custom calling features complex hardware in the form of trunk circuits and complex programs in the central processing unit of the switching office are required.

When these custom calling features interface with one another further complexity is added to both the trunking arrangement and the program. Among these features the more complex are call waiting and three way calling. These features are the most complex since they require the greatest amount of hardware and program to handle their operation. Call waiting service as defined as: A call waiting subscriber will hear a short tone, if he is already using his line and the second party is attempting to reach him. The second party receives normal ring back tone and the line is split, so that only the subscriber to be called will hear the short tone. The tone will be repeated in 10 seconds as a reminder, and if unanswered, the second party will receive ring back tone. If the subscriber wants to end his first call he simply hangs up and his phone will ring with the second party on the line. If he wants to hold the first party while answering the second, he presses the hookswitch for one-half a second. With this method he can switch between parties at will.

Three way calling service is defined as: A three way calling subscriber can add a third party to an existing conversation. While the subscriber is conversing with another party, a third party can be added to the conversation by depressing his hook-switch for one-half a second. This puts the original party on hold, and the subscriber will hear a special dial tone (3 spurts of tone followed by regular dial tone). He can then dial the third party and hold a private conversation with the third party. To establish the three way connection the subscriber must again depress its hookswitch for one-half a second. If the third party did not answer or if the subscriber wants to drop a third party from the three way call, he simply depresses his hookswitch for one-half a second and the original parties re-established (and the subscriber may again establish a three way call). To disconnect, the subscriber simply hangs up and all connections will be broken down.

These custom calling features required specialized trunk arrangements and complex program for the manipulation of the connection of parties in response to hookswitch flashing. Arrangements for connecting custom calling subscribers individually are shown in an article entitled "Custom Calling Services on No. 1 EAX" by J. D. McLean in the GTE Automatic Electric Technical Journal, July, 1976, Vol. 15—No. 3. This article shows basic configurations for the establishment of call waiting and three way calling custom features as independent calls. This article shows the special trunks and junctors which were developed for the implementation of these custom calling features. However, the article does not deal with the interconnection of these custom calling features to one another and the resulting complexity added by this arrangement.

One manner in which to handle the problem of interacting custom calls is to prevent subscribers from calling other subscribers who have active custom calling features. This is not a suitable solution since certain subscribers would be unable to reach whomever they chose to call. Another solution is to provide complex trunks or to increase the logic of the controlling program to accommodate all the interactions of two interacting custom calls. However this situation results in expensive trunk arrangements which are undesirable since they increase the cost of the custom calling feature to the subscriber.

The above mentioned problems are further compounded when both of the interacting custom calls are made from the same switching office. This situation means that one switching office must control the operation of multiple custom calls, making the interacting decisions very complex.

Accordingly it is the object of the present invention to provide a simple trunking arrangement and program for the operation of multiple interacting custom calls within a particular telephone switching office for the situation of a call waiting subscriber, who is a party in another call waiting call, receiving an incoming call.

SUMMARY OF THE INVENTION

The present invention comprises an arrangement for multiple custom calling telephone calls within a switching office. Two telephone subscribers one with a custom calling feature are connected in a first telephone call via a switching network. Another custom calling subscriber calls the first call waiting subscriber and as a result a call waiting call is initiated with the first subscriber as the controlling party. Next, another subscriber attempts to call the call waiting subscriber who is not the controlling party in the first call waiting call. Thereby, a second call waiting call is initiated between the controlling party in the first custom call, the other custom caller as the controlling party in this second call waiting call and the other subscriber whose call gave rise to the second call waiting call. As a result the two call waiting calls interact at the connection of the two custom calling subscribers.

Each subscriber is connected via a line circuit to the switching network. A first one of the custom calling subscribers has established a call waiting call with himself as the controlling party, another custom calling subscriber and a POTS (plain old telephone service) subscriber. Each of these subscribers is connected via the switching network to the controlling custom caller. The non-controlling custom calling subscriber in this call waiting call has the call waiting feature.

When the stored program detects a second POTS subscriber's attempt to dial the non-controlling custom calling subscriber, this custom calling subscriber's line is found busy. However, since the non-controlling custom calling subscriber has call waiting service and is not the controlling party in the first call waiting call, he can selectively connect to the new incoming call and the existing call waiting call in which he is not controlling. It should be noted that a custom calling subscriber may have only one custom calling feature active at any one time. In the example above, if the non-controlling call waiting subscriber was also the controlling party in a three way call, the new incoming call would receive busy tone.

In order to connect the new incoming call to the non-controlling custom calling subscriber, this custom calling subscriber is temporarily disconnected from the first call waiting call. The stored program of the CPU provides the necessary holding to this subscriber. Simultaneously, a talking path is established under control of the program from the controlling custom calling subscriber of the first custom call to a loop around trunk through the switching network. In addition, the program establishes another talking path from the loop around trunk to the controlling custom caller in the second call waiting call. Lastly, a connection is established via the switching network from the controlling subscriber in the second call waiting call to the new incoming caller by the program.

As a result the two custom calling subscribers are separated by the loop around trunk. The hookswitch flashed of these subscribers can be simply and easily interpreted by the circuitry and stored program since the flashes are not transmitted through the loop around trunk. The two custom calls operate as though they were located in different central switching offices.

DESCRIPTION OF THE PREFERRED EMBODIMENT

Figure 1:
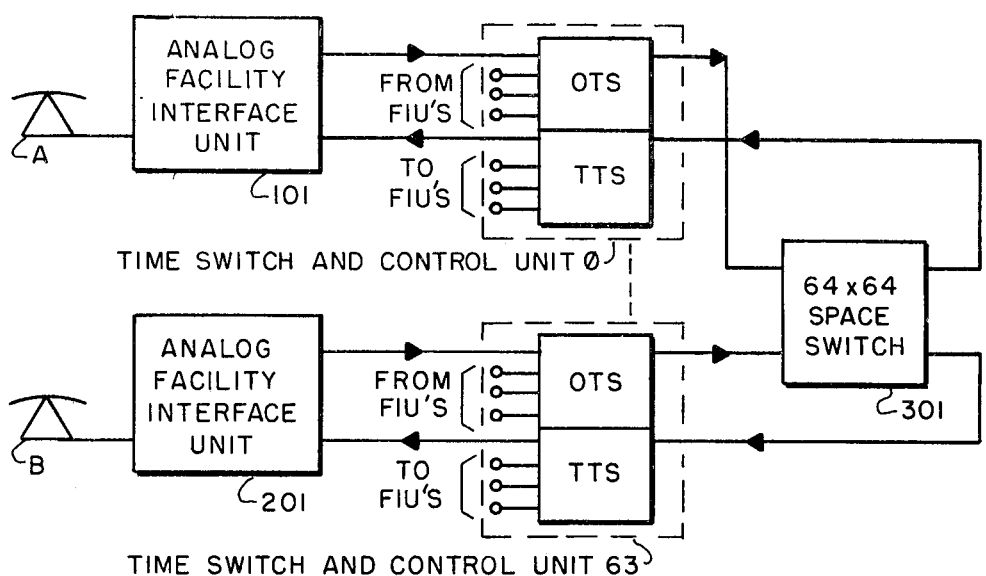
FIG. 1 is a block diagram depicting the overall network structure of associated with the present invention.

FIG. 1 is a block diagram showing a T-S-T network of a digital switching center for switching a local to local telephone call between POTS subscribers. Subscriber A is connected via an analog facility interface unit (FIU) 101. The analog FIU 101 has a PCM voice connection to time switch and control unit (TCU) 0. Each TCU has 2 time stages associated with it, an originating time stage (OTS) and a terminating time stage (TTS).

A connection is made from the OTS of a particular TCU to the 64 by 64 space switch 301. Then, a connection is established between the space switch 301 and the terminating time stage of TCU 63, for example. Subscriber B is connected through analog FIU 201 to the TTS of TCU 63.

Next a voice transmission link is established from subscriber B to subscriber A. This communication link is established via FIU 201, the OTS of TCU 63, through space switch 301, through the TTS of TCU 0, through analog FIU 101 to subscriber A. As a result, a full talking path has been established between subscribers A and B.

Figure 2:
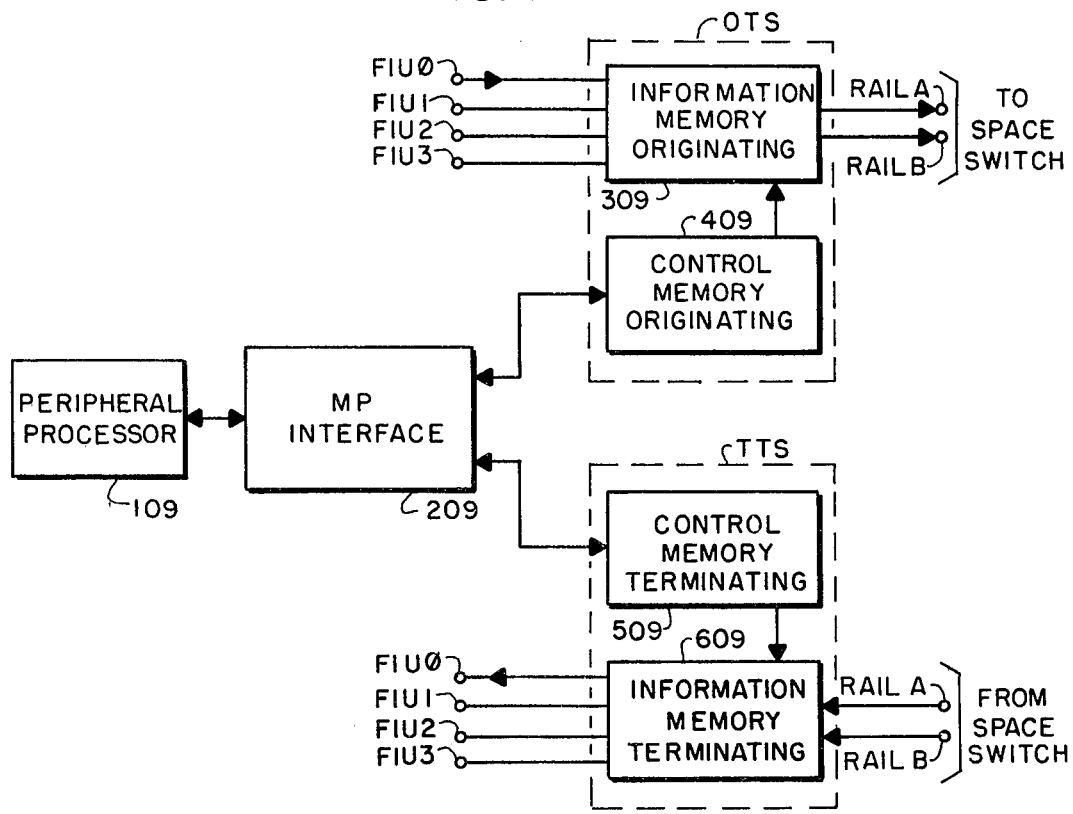
FIG. 2 is a block diagram depicting the originating and terminating time stages of the present invention and their connection to the central processing unit.

FIG. 2 shows the connection of a particular TCU to a corresponding microprocessor CPU 109. Each stage of a time and control unit inlcudes an information memory and a control memory. For example, the originating time stage OTS shown includes an information memory 309 and a control memory 409. Microprocessor interface 209 connects the CPU 109 to the control memories 409 and 509.

The information memories 309 and 609 each contain information memory units with PCM samples. Up to four FIU's may be connected to each TCU. These FIU's may be analog line FIU's, connecting telephone subscribers to the network, as shown in FIG. 1 or analog trunk FIU's for connecting calls to service or outgoing trunk circuits.

Figure 3B:
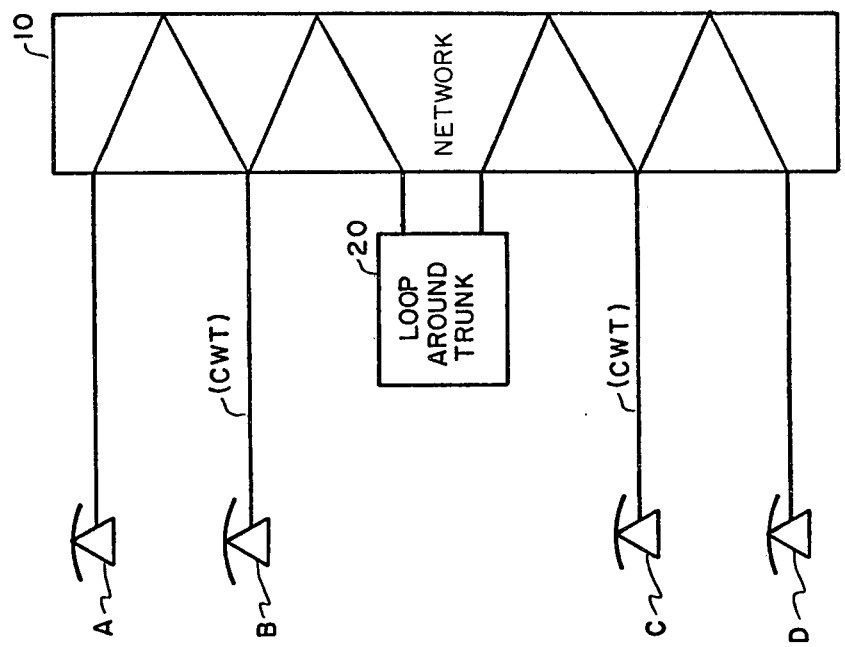
FIG. 3B is a block diagram depicting the multiple custom calling network arrangement in accordance with the present invention.
Figure 3A:
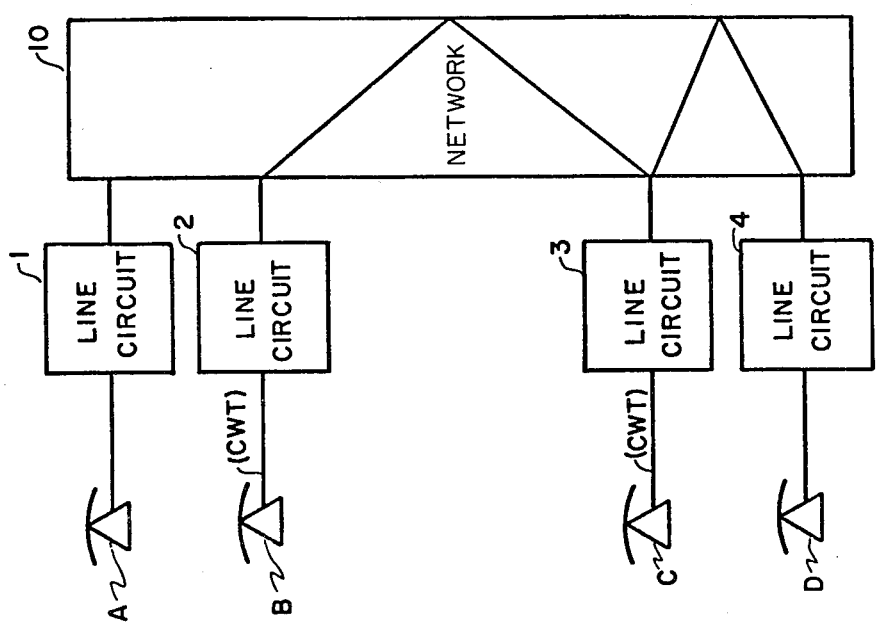
FIG. 3A is a block diagram depicting an existing call waiting call situation between two custom callers and a POTS subscriber with another subscriber attempting to call one of the custom calling subscribers.

Referring now to FIG. 3A, network 10 includes such elements as analog FIU's, time switch and control units, which further include information and control memories, and a space switching stage. The configuration shown is that three subscribers B and D are connected to subscriber C as the controlling party in a call waiting call. Each of the subscribers A through D is connected to the switching network 10 via a line circuit 1 through 4 respectively.

Subscriber B is shown to have call waiting service (CWT). Subscriber C also has call waiting service (CWT), and is the controlling party in the existing call waiting call between subscribers B, D and himself. Subscribers A and D are plain old telephone service (POTS) subscribers.

Subscriber A is attempting to call subscriber B, a call waiting service subscriber. Subscriber B is already engaged as a non-control party in an existing call waiting call with subscribers C and D. Typically, subscriber A would receive a busy tone signal. Since subscriber B is a call waiting subscriber, subscriber B will receive a tone signal indicating that subscriber A is attempting to call. Subscriber B is then able to manipulate his hookswitch to selectively connect to subscriber A.

As shown in FIG. 3B when the stored program of the CPU detects subscriber A's call to subscriber B, a reconfiguration is required. The program must first determine that the called subscriber, B, has call waiting class of service. Since subscriber B is a call waiting custom caller and is engaged in an existing call waiting call, there is a multiple custom calling situation and special handling must occur.

The program must instruct the switching network 10 to temporarily disconnect subscriber B while providing the necessary hold in order to avoid dropping the call altogether. Next, the program selects a path from subscriber C through switching network 10 to loop around trunk 20. Simultaneously, a second path is established under program control from loop around trunk 20 through switching network 10 to subscriber B.

Lastly, a connection is established from subscriber A to subscriber B via switching network 10 under program control. As a result of the connection of loop around trunk 20, the two custom calls (the first call waiting call between subscribers B, C and D and the second call waiting call between subscribers A, B and C) are isolated from one another. Now hookswitch flashes of subscriber B are interpreted by the CPU's program via sensors associated with each subscriber's line circuit and not forwarded through loop around trunk 20.

Since the hookswitch flashes of subscriber B are separated from those of subscriber C and vice versa, the basic logic design of all the system's trunks are greatly simplified.

The loop around trunk 20 makes the two custom calls appear as though they are in different switching centers connected by a trunk circuit. As a result, the control trunk logic is minimized. In additon, the program logic required for outgoing custom calls and intra-office custom calls may be similar resulting in the great savings of program logic. The program logic saved via this loop around trunk configuration is equivalent to approximately 1000 manhours of design development time.

It is to be noted that the complex situation of subscriber disconnects during multiple custom calls is handled as though only a single custom call was involved. This is a further result of the separation via loop around trunk 20 of the two custom calls.

Although a preferred embodiment of the invention has been illustrated and that form described in detail, it will be readily apparent to those skilled in the art that various modifications may be made therein; without departing from the spirit of the invention or from the scope of the appended claims.

What is claimed is:

1. In a telephone switching office, an arrangement for multiple custom calling comprising:
   a CPU;
   a switching network connected to said CPU;
   a plurality of telephone subscribers connected to said switching network including at least a first and second custom calling subscriber and a third and a fourth telephone subscriber;
   first means for connecting said second custom calling subscriber to said third telephone subscriber via said switching network in an active telephone call;
   second means for connecting said second custom calling subscriber to said first custom calling subscriber via said switching network in an active first call waiting call;
   means for detecting a request for a second call waiting call from a fourth telephone subscriber to said first custom calling subscriber, said means for detecting connected to said switching network and being operated to transmit said second call waiting call request to said CPU;
   means for temporarily disconnecting said first subscriber from said first call waiting call, said means for temporarily disconnecting being connected to said switching network and operated in response to said request to said CPU for said second call waiting call;
   third means for connecting said fourth telephone subscriber to said first custom calling subscriber via said switching network, said third means for connecting operated in response to said means for temporarily disconnecting to render said second call waiting call an active telephone call; and
   fourth means for connecting telephone subscribers within the same switching office, said fourth means for connecting being connected to said first custom calling subscriber via said switching network and connected to said second custom calling subscriber via said switching network, said fourth means for connecting operated in response to said means for temporarily disconnecting to provide for a talking path connection of said first and said second custom calling subscribers while rendering each of said first and said second active calling waiting calls independently controlled.

2. An arrangement for multiple custom calling as claimed in claim 1, wherein said fourth means for connecting includes:
   a loop around trunk having output connections for connecting to said switching network and input the connections for connecting to said same switching network.

3. An arrangement for multiple custom calling as claimed in claim 2, wherein said fourth means for connecting further includes:
   a first connection from said first custom calling subscriber through said network to said loop around trunk;
   a second connection from said loop around trunk to said second custom calling subscriber through said switching network; and
   fifth program means operated in response to said means for temporarily disconnecting to establish said first and said second connections, whereby a talking path is re-established between said first custom calling subscriber and said second custom calling subscriber and between said second custom calling and said third telephone subscribers while simultaneously another independently controlled talking path is established between said first custom calling subscriber and said fourth telephone subscriber.

4. An arrangement for multiple custom calling as claimed in claim 1, wherein said switching network comprises a digital switching network.

5. An arrangement for multiple custom calling as claimed in claim 4, wherein said digital switching network further comprise a time-space-time digital switching network.

6. An arrangement for multiple custom calling as claimed in claim 1, wherein said connections of each of said plurality of telephone subscribers includes a line circuit.

* * * * *